United States Patent [19]
Reusch

[11] Patent Number: 5,156,027
[45] Date of Patent: Oct. 20, 1992

[54] PROTECTIVE SAFETY DEVICE FOR CASSETTE TAPE RECORDERS

[75] Inventor: Robert C. Reusch, Munhall, Pa.

[73] Assignee: John B. Sotak, N. Huntingdon, Pa.

[21] Appl. No.: 740,106

[22] Filed: Aug. 5, 1991

[51] Int. Cl.⁵ ............................................ E05B 65/00
[52] U.S. Cl. ............................................ 70/14; 70/58; 70/169; 292/DIG. 65
[58] Field of Search .............. 70/14, 58, 169, 57; 292/DIG. 65; 206/1.5

[56] References Cited

U.S. PATENT DOCUMENTS

| | | | |
|---|---|---|---|
| 2,936,189 | 5/1960 | Pearson | 206/1.5 |
| 3,405,960 | 10/1968 | Wargo | 292/145 |
| 3,666,338 | 5/1972 | Russell | 292/1 |
| 4,286,809 | 9/1981 | Godwin | 292/DIG. 65 |
| 4,527,405 | 7/1985 | Renick et al. | 70/14 |
| 4,607,301 | 8/1986 | Iizuka | 360/93 |
| 4,655,057 | 4/1987 | Derman | 70/14 |
| 4,908,728 | 3/1990 | Pinkett | 360/137 |
| 4,922,734 | 5/1990 | Iannucci | 70/58 |
| 4,959,979 | 10/1990 | Filipow et al. | 70/58 |
| 4,964,286 | 10/1990 | Poyer | 70/14 |
| 4,977,762 | 12/1990 | Dennis | 70/14 |
| 5,022,242 | 6/1991 | Povilaitis | 70/14 |

FOREIGN PATENT DOCUMENTS 2163522 6/1986 United Kingdom .
2213628 8/1989 United Kingdom .

Primary Examiner—Renee S. Luebke
Assistant Examiner—D. Boucher
Attorney, Agent, or Firm—John B. Sotak

[57] ABSTRACT

A latchable safety protection device for covering the cassette receiving opening of a cassette tape recorder for preventing the introduction of foreign elements into the recording chamber in which the device includes a plastic body having an integral hollow insert portion and cover portion. A pair of spring biased latching members which engage the sides of the cassette receiving opening, and a pair of slidable release members for retracting the spring biased latching members to permit the withdrawal of the device from the cassette receiving opening to allow the insertion of a tape cassette.

20 Claims, 2 Drawing Sheets

PROTECTIVE SAFETY DEVICE FOR CASSETTE TAPE RECORDERS

FIELD OF THE INVENTION

This invention relates to a latchable protective closure for audio/video cassette tape recorders and more particularly to a safety guard device having an insertable portion for insertion into the cassette tape receiving opening of a VHS or BETA type of video cassette tape recorder (VCR), a pair of retractable latching portions for engagement with sides of the opening and a shield portion for covering the cassette tape receiving opening for preventing the intentional or inadvertent introduction of foreign material or objects into the cassette tape receiving opening and into the operating chamber of the VHS or VCR video cassette tape recorder.

BACKGROUND OF THE INVENTION

In recent years, VHS-VCR video cassette tape recorders have become very common and extremely popular in homes or households as a means of providing very enjoyable entertainment and pleasure for all members of the family. The rental of cassette tapes has become quite reasonable and the wide selection of movies both for adults and children makes the cassette tape recorder highly acceptable as a means of amusement. However, service and maintenance have been a problem in some households, particularly those that have pre-school children. Generally, cassette tape recorders including a spring-loaded pivot door which, when closed, functions to prevent the entry of dust, lint, and other airborne matter. The swinging door readily permits the quick and easy insertion of a cassette tape into the rectangular opening in the front of the video cassette tape recorder, however, the pivoted door does not prevent the intentional and accidental insertion of foreign objects into the opening of the cassette tape recorder. It has been found that unsupervised minors insert such things as lipstick, pencils, pens, coins, toys, string, paper, wrappers, candy, chewing gum, food, as well as other objects in the opening which could cause damage to the recorder. In most cases, the children are not acting out of viciousness, but are simply trying to bribe the VCR or are attempting to hide things for safekeeping. While there have been a number of previous types of security or locking devices, each of these prior art designs included a number of shortcomings which made them less than wholly satisfactory for domestic usage. In one instance, it was proposed to employ a dummy cassette having substantially the same dimensions and configurations as an actual standard video cassette tape. Since the dummy cassettes include the rear holes for receiving the drive spindles, it has the disadvantages that they can activate the mechanism which receives the tape of the cassette recorder. In addition, these previous dummy cassettes generally included an expensive and complex locking arrangement which necessitated careful insertion and alignment of the dummy cassette with the internal walls of the receiving opening to permit secure holding of the dummy cassette through the rear holes or to the drive spindles of the cassette tape recorder. In other security devices for deterring and inhibiting unauthorized usage, it is common practice to employ a key-operated lock mechanism that locks into the cassette insert opening. However, key-operated locks have several disadvantages in that the removable key may be misplaced or lost, and in some cases a forgotten key may allow a child to unlock and open the cassette opening and then cause the cassette recorder to "eat" the key which could result in extensive damage and expensive repair.

OBJECTS AND SUMMARY OF THE INVENTION

Accordingly, it is an object of this invention to provide a new and improved latchable protection device for preventing the inadvertent insertion of foreign objects into the opening of a video cassette tape recorder.

A further object of this invention is to provide a substantially all-plastic guard device of simple and unique construction which is insertable into a video cassette tape receiving opening of a video cassette tape recorder.

Another object of this invention is to provide a unique protective cover arrangement having a body portion being inserted and latched in a cassette tape receiving opening of a video cassette tape recorder and having face plate for covering the cassette tape receiving opening to prevent the unwanted introduction of foreign articles.

Yet a further object of this invention is to provide a molded plastic protective device for cassette tape recorders in which a rectangular body portion is inserted into a frontal cassette tape receiving opening formed in the cassette tape recorder and having an integral rectangular cover member placed over the matching opening and a keyless spring-loaded latching mechanism for being securely latched against the inner side walls of the cassette tape receiving opening.

Yet another object of this invention is to provide an improved guard arrangement for a VHS or BETA format video cassette tape recorder in which a rectangular box-like body member is interposed into a cassette insert opening in the recorder and having an integrated cover member for completely covering the opening and having a pair of slidable spring biased gripping members for positively engaging and latching against the side walls of the opening and a pair of retractable tab members for disengaging the gripping members from the side walls of the opening so that the body member may be withdrawn from the opening of the video cassette tape recorder.

Still a further object of this invention is to provide a protective device for a video cassette tape recorder for preventing the insertion of foreign articles into the cassette tape receiving opening during non-usage comprising, a molded plastic unit including a hollow rectangular insert portion and an integrated cover portion, a pair of spring-load gripping members slidably mounted within the hollow rectangular body portion, each of the pair of spring-loaded gripping members fastened to a movable member for retracting each of the pair of spring-loaded gripping members from the sides of the cassette tape receiving opening, and a knob for pulling the molded plastic unit out of the cassette tape receiving opening.

Still another object of this invention is to provide a safety guard device for covering the cassette receiving opening of a cassette tape recorder for preventing insertion of foreign objects comprising, a plastic body having an integral insert portion and cover portion, a pair of biased latching members which engage the sides of the cassette opening, a slidable release member cooperatively associated with each of the pair of biased latching members for retracting and disengaging the pair of biased latching members to allow one to pull out the safety guard device by a knob carried by the cover portion. An additional object of this invention is to provide a device for protecting and guarding the tape receiving opening of a video cassette recorder comprising, an injected molded polystyrene body having a hollow rectangular insertable portion for being inserted into the cassette receiving opening and having a rectangular cover portion for covering the cassette receiving opening, a spring biased latching member slidably guided within each end of the hollow rectangular insertable portion and having a plurality of steps for engaging the respective sides of the cassette receiving opening, a slide knob fastened to each of the spring biased latching member for retracting and disengaging the steps from the sides of the cassette receiving opening and a pull knob for withdrawing the hollow rectangular insertable portion from the cassette receiving opening.

In addition, it is an object of this invention to provide a new and improved protective cassette tape guard device which is simple and economical in construction, reliable in operation, efficient in service, durable in use, and effective in practice.

DESCRIPTION OF THE DRAWINGS

The above objects and other attendant features and advantages will be more readily appreciated as the present invention becomes better understood by reference to the following detailed description when considered in conjunction with the accompanying drawings, wherein.

DETAILED DESCRIPTION OF THE INVENTION

Figure 1:
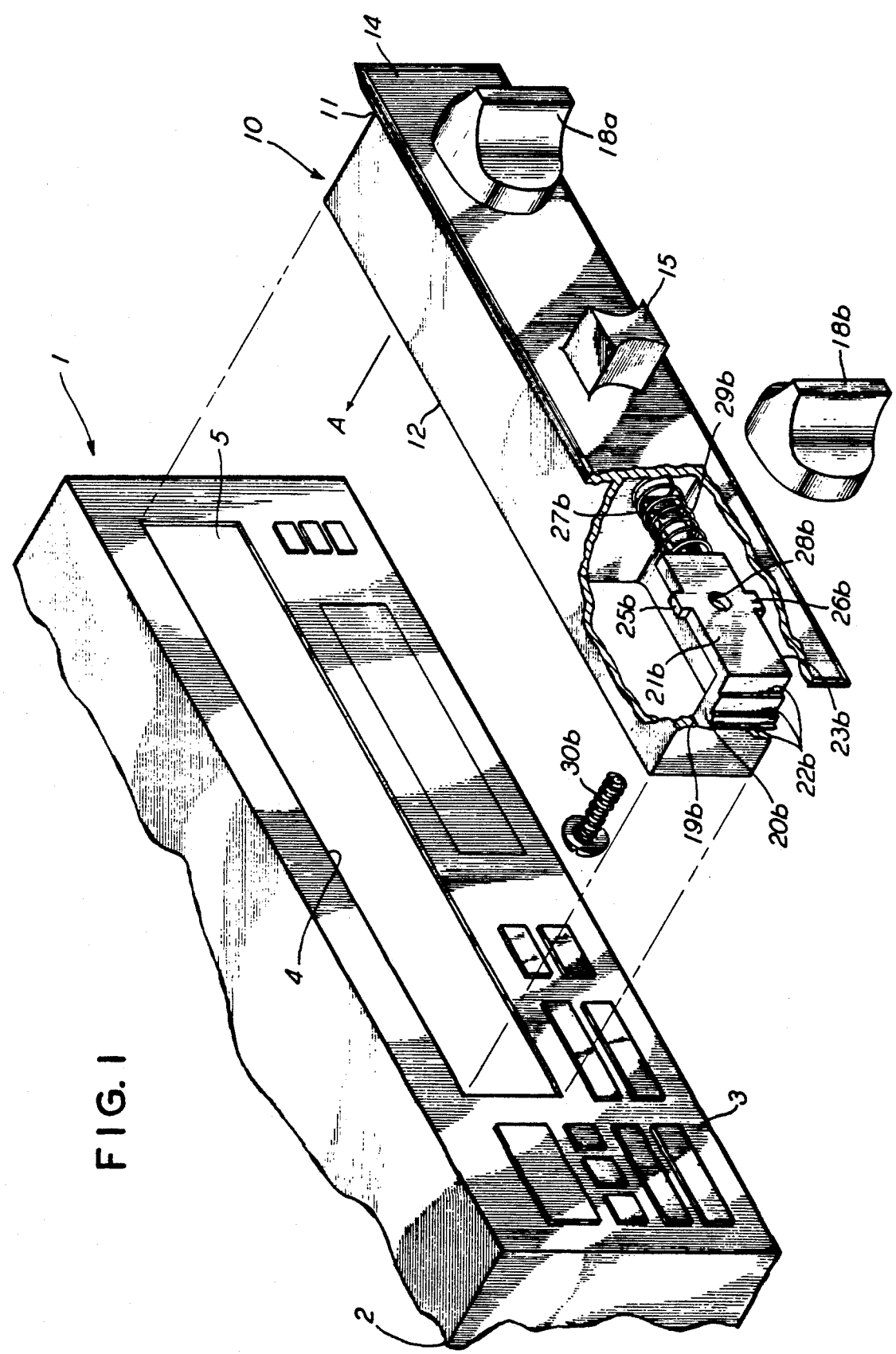
FIG. 1 is a fragmentary perspective view of a video cassette tape recorder having a cassette tape receiving opening for accommodating a protective safety guard device in accordance with the present invention.

Referring now to the drawings, and in particular to FIG. 1, there is shown an audio-video cassette tape recorder generally characterized by numeral 1 for receiving and playing appropriate magnetic tape cassettes. The most common types of recorders are generally VHS or BETA format devices or machines which are made by a multitude of manufacturers and are universally available on the open market in virtually every country in the world. As shown, the recorder 1 includes a sheet metal box-like casing 2 which houses the internal operating mechanism consisting of the mechanical, electrical and electronic components. Generally, the recorders include a front panel or face plate 3 which carries the control knobs and/or pushbuttons, the indicating lights or lamps, display functions, and the clock or timer, etc., not characterized. It will be seen that the front panel 3 also includes a rectangular opening 4 for receiving and positioning the magnetic tape cassettes which engage the tape heads for playing the cassettes. In the present instance, the opening 4 of recorder 1 is provided with a cover or door 5 which is hinged about an upper horizontal axis and is normally biased toward a closed position by a suitable spring (not shown).

Basically, the size, namely, the vertical and horizontal dimensions of the tape receiving openings of the video cassette recorders of the various manufacturers may vary slightly, however, each is designed to accept the casings of the standard tape cassettes. Normally, the video tapes are encased in a plastic container having an appropriate length, width and thickness of approximately seven and three-eighths inches (7⅜"), four and one-sixteenths inches (4 1/16"), and fifteen-sixteenths inch (15/16"), respectively. Accordingly, each manufacturer of VHS and BETA types of VCR tape players must dimension the easy loading front cassette receiving opening of their particular recorders to accept the standard magnetic tape cassettes. While these small dimensional variations in the cassette receiving openings of the recorders of the different manufacturers is normally of little consequence during ordinary usage, however, the size differentials must be taken in consideration in practicing the present invention, as will be described in detail hereinafter.

As shown in FIG. 1, it will be seen that a latchable protective closure or safety guard device generally characterized by numeral 10 is adapted to be inserted into the cassette receiving opening 4 when the video cassette recorder 1 is not in use and no cassette tape is placed in the video cassette recorder 1 in order to prevent the intentional or inadvertent insertion or introduction of foreign objects into the video cassette recorder via the dust covered opening 4. It will be seen that the protective closure or guard device 10 includes a main plastic body portion 11 which is an integrally formed member and which is completely molded in one injection in a single or multiple cavity mold. The type of plastic of the injection molded body is preferable, but not limited to impact polystyrene which is lightweight and which has good physical strength and electrical insulating characteristics.

Figure 2:
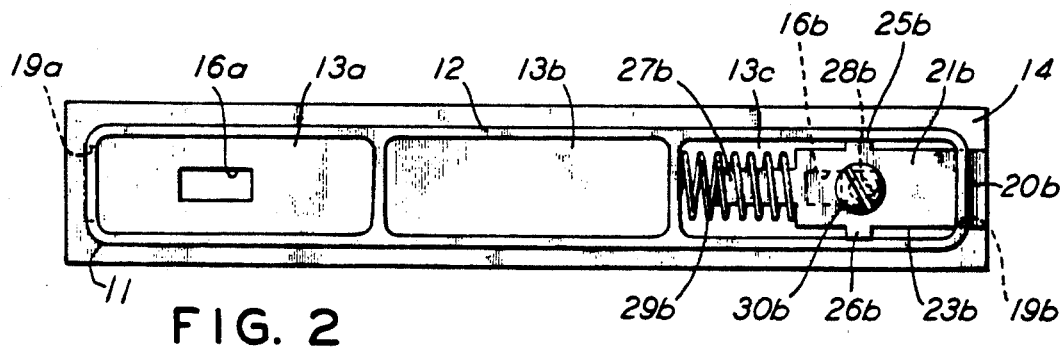
FIG. 2 is a slightly reduced rear end view of the safety device with the left-hand latching and release portions omitted.
Figure 3:
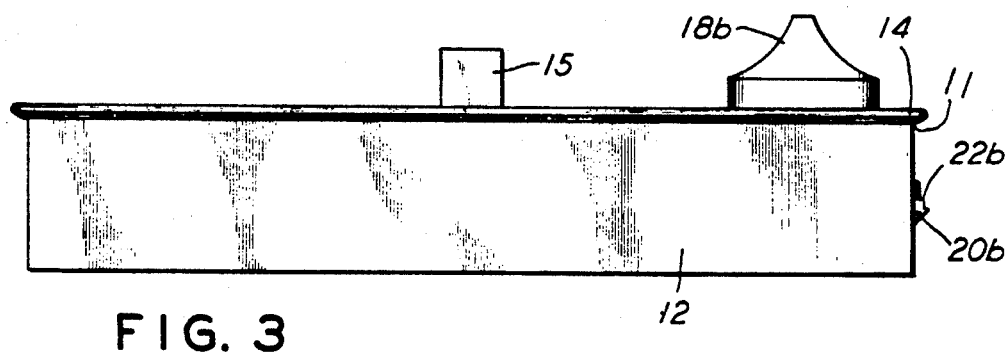
FIG. 3 is a side elevational view of the protective safety guard device of FIG. 2.

As shown in FIGS. 1, 2, and 3, the main body portion 11 includes a rear hollow elongated rectangular portion 12 which is dimensioned and designed to fit into the unoccupied or empty cassette receiving opening 4. It will be noted in FIG. 2 that rear hollow portion 12 includes three (3) rectangular compartments or cavities 13a, 13b, and 13c which will be described presently. In viewing FIGS. 1, 2, 3, and 4, it will be observed that the main body includes an integral flat front elongated rectangular panel or plate 14 which is slightly larger than the rear rectangular portion 12. Thus, upon full insertion of the main body 11 into the opening 4, the front panel 14 will totally cover the opening 4. It will be seen that the outer peripheral edges of the front panel 14 provide a substantially flush-fit with the front face of panel 3 so that thin objects, such as paper, candy and chewing gum wrappers and the like, may not be easily worked or slid into the interior of the recorder 1 when the safety guard device 10 is latched in place.

Figure 4:
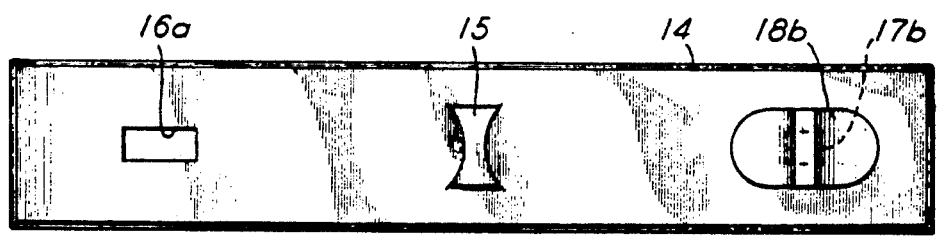
FIG. 4 is a front end view of the protective safety guard device of FIGS. 2 and 3.
Figure 5:
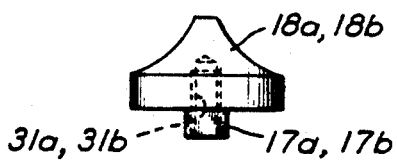
FIG. 5 is a side elevational view of a slide knob used in safety guard device.

It will be noted in FIGS. 1, 3, and 4, the front of the panel 14 is provided with a centrally located plastic handle member 15 which is shaped as a biconcaved knob. The knob 15 is integrally formed or suitably attached to the front face and is used in inserting and removing the protective device 10. As shown, the front panel 14 is provided with a pair of elongated rectangular slots, one of which is number 16a, as illustrated in FIGS. 2 and 4. The two elongated slots are located within the confines of the two end cavities 13a and 13c and are adapted to accommodate the inner square portions 17a, 17b of slide knob members 18a, 18b, as shown in FIGS. 1, 2, 4, 5, and 6. It will be seen that the outer side surfaces or exterior edges of knobs 18a and 18b are configured as gradually sloped or decreasing concaved surfaces which virtually makes it impossible for a child to release and withdraw the guard device by the slide knobs as will be described hereinafter.

Figure 7:
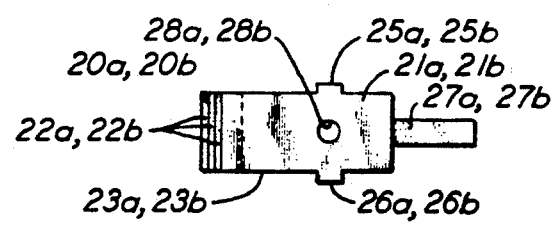
FIG. 7 is a top plan view of the latching member of the protective safety guard device.
Figure 6:
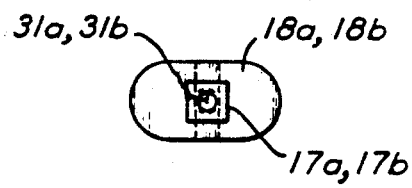
FIG. 6 is a bottom plan view of the slide knob of FIG. 5.
Figure 8:
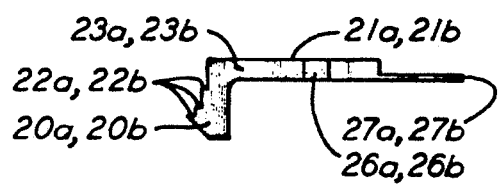
FIG. 8 is a side elevational view of the latching member of FIG. 7.

As shown in FIGS. 1 and 2, the outer side walls of cavities 13a and 13c are provided square-like openings 19a, 19b for accommodating stepped foot portions 20a, 20b of latching members 21a, 21b. It will be noted that the outer face of each of the foot portions is provided with a plurality of gripping steps or graduated ledges 22a, 22b, the purpose of which will be described hereinafter. In viewing FIGS. 1, 2, 7, and 8, it will be observed that the latching members 21a, 21b each includes an intermediate body portion 23a, 23b having laterally extending guide tabs 25a, 25b and 26a, 26b, and having reduced leg members 27a, 27b extending from the end remote from the stepped leg portions 20a, 20b. The tabs 25a and 25b are guided by the top and bottom walls of cavity 13a while the tabs 26a and 26b slide along the inner surfaces of the top and bottom walls of cavity 16b. As shown in FIGS. 1, 2, and 7, a through hole 28a, 28b is centrally formed in the intermediate body portions 23a, 23b. The latching members 21a, 21b are assembled by initially inserting the stepped foot portions 20a, 20b through the openings 19a, 19b. After placing a helical biasing spring 29b around leg member 27b, a threaded screw 30b is passed through hole 28b and is aligned with the hole 31b formed in the underside of slide knob 18b. The screw 30b is securely tightened so that the adjacent flat surface of the latching member 21b is slightly spaced away from the underside of the cavity 13c. In practice, this clearance spacing is achieved by the square portion 17b which has a depth slightly larger than the thickness of the latching member 21b. Normally, the latching member 21b is biased outwardly by the helical spring 29b which is caged between the inner wall of cavity 13c and the shoulder portions formed between leg 27b and the body portion 23b. The square portion 17b and the outer wall of the elongated slots 16a and 16b act as a stop to limit the outward movement of the latching member 21b while square portion 17b and the inner wall of the elongated slots 16a and 16b function as an inward stop. In its outward position, all the steps 22b are exposed and project beyond the one end of the main body portion 11. The latching member 21a is assembled in the same way in cavity 13a and an associated helical biasing spring urges the latching member 21a outwardly so that steps 22a are exposed and project beyond the outer end of the main body portion 11.

Now let us assume that the cassette tape has been ejected and that the user wishes to prevent any possible introduction of foreign objects into the operating chamber of recorder 1 by inserting and latching the safety guard device 10 into the cassette receiving opening 4. The user may simply grasp the handle member 15 with the thumb and forefinger of one hand and may align the rear rectangular portion 12 of the guard device 10 with the cassette receiving opening 4. Then, the rear portion 12 is simply pushed into the opening 4 until the rear surface of the front panel 14 is perfectly flush with the front face of the display plate 3. It will be appreciated that steps 22a and 22b of the spring biased latching members 21a and 22b, respectively, will ride over the side edges of opening 4 and will latch against the inner face of the front panel 3. Thus, the guard device 10 is positively latched in place by the steps 22a and 22b and may not be withdrawn and removed by simply pulling on the handle 15. To extract the guard device 10, it is first necessary to grasp the outer concaved surfaces of the slide knobs 18a and 18b with the thumb and middle finger of one hand of an adult user and to pull the knobs toward each other to withdraw the engagement of the steps 22a and 22b with the inside of the face plate 3. However, this will not allow the withdrawal or removal of the guard device 10 since the curvature or slope surfaces of the slide knobs tend to cause the guard device to be forced inwardly into the opening 4. That is, any pressing force on the outer sloped surfaces of knobs 18a and 18b produces a component force in the direction of arrow A, as shown in FIG. 1, which prevents the withdrawal of the guard device 10 by a child who attempts to use the fingers of both hands to depress the latching members 21a and 21b. After the adult user depresses the slide knobs 18a and 18b with one hand, the safety guard device 10 can be removed by grasping the handle 15 with the other hand and pulling the guard device out of the opening 4 to permit the subsequent insertion of the video cassette tape.

In addition, the distance between the slide knobs 18a and 18b has been designed so that a child normally cannot span the knobs with one hand and therefore cannot remove the latched safety guard device.

It will be understood that variations, modifications, equivalents and substitutions for components of the above specifically-described embodiment of the invention may be made by those skilled in the art without departing from the spirit and scope of the invention as set forth in the appended claims. For example, the concaved surfaces of the slide knobs may take the form of tapered straight surfaces to provide an inward force vector when the knobs are compressed and moved toward each other. The square-shaped portions 17a and 17b may be changed to rectangular shapes which would ensure that the sloped surfaces of knobs 18a and 18b would face outwardly toward the ends of the safety guard device when the latching members are assembled. The shape and type of the pull-out handle may take other forms and shapes, such as, cylindrically shaped or the like. Further, the number of steps or teeth may be varied and the distances between the teeth may be changed.

Thus, the present invention has been described in such full, clear, concise and exact terms as to enable any person skilled in the art to which it pertains to make and use the same, and having set forth the best mode contemplated of carrying out this invention, I state that the subject matter, which I regard as being my invention, is particularly pointed out and distinctly asserted in what is claimed.

What I claim is:

1. A protective device for a video cassette tape recorder for preventing the insertion of foreign articles into the cassette tape receiving opening during non-usage comprising, a molded plastic unit including a hollow rectangular insert portion and an integrated cover portion, a pair of spring-load gripping members slidably mounted within said hollow rectangular body portion, each of said pair of spring-loaded gripping members fastened to an individual outwardly projecting movable member for separately retracting each of said pair of spring-loaded gripping members from the sides of the cassette tape receiving opening, each of said movable members having a configuration which results in an inward force in a direction opposite to the outwardly projecting movable member to prevent the withdrawal of said molded plastic unit when said pair of spring-loaded gripping members are retracted, and a knob for pulling said molded plastic unit out of the cassette tape receiving opening when said pair of spring-loaded gripping members are retracted.

2. The protective device as defined in claim 1, wherein said hollow rectangular body potion includes side openings for accommodating a foot portion of said pair of spring-loaded gripping members.

3. The protective device as defined in claim 2, wherein exterior edge of said foot portion of said pair of spring-loaded gripping members is stepped to permit interlocking with the sides of the cassette tape receiving opening.

4. The protective device as defined in claim 1, wherein each of said movable members includes a half of a biconcaved outer surface which exerts an inward force when one attempts to retract said pair of spring-loaded gripping members.

5. The protective device as defined in claim 1, wherein each of said movable members includes an inner square-shaped portion which slides in a rectangular opening formed in said cover portion of the molded plastic unit.

6. The protective device as defined in claim 1, wherein said spring-loaded gripping members include laterally extending intermediate tabs which slidably engage guide walls formed on the interior of said hollow rectangular body portion of said molded plastic unit.

7. The protective device as defined in claim 1, said each of said spring-loaded gripping members includes a reduced leg portion which is encompassed by a helical spring.

8. The protective device as defined in claim 1, wherein each of said movable members includes an outer semi-duplex concaved surface.

9. The protective device as defined in claim 1, wherein each of said movable members includes a sloped surface which tends to prevent withdrawal of the protective device when one retracts said pair of spring-loaded gripping members.

10. A safety guard device for covering the cassette receiving opening of a cassette tape recorder for preventing insertion of foreign objects comprising, a plastic body having an integral insert portion and cover portion, a pair of biased latching members which engage the sides of cassette receiving opening, a manually slidable release member cooperatively associated with each of said pair of biased latching members for retracting and disengaging said pair of biased latching members from engagement with said sides of the cassette receiving opening, each of said manually slidable release members having an outer sloped surface which provides a component force vector toward said cassette receiving opening to prevent the safety guard device, and a knob carried by the cover portion allows the safety guard device to be pulled out after said pair of biased latching members are retracted and disengaged.

11. The safety guard device as defined in claim 10 wherein said plastic body is formed from impact polystyrene.

12. The safety guard device as defined in claim 10, wherein said plastic body including said insert portion and said cover portion is formed by injection molding.

13. The safety guard device as defined in claim 10, wherein said insert portion is a rectangular hollow member.

14. The safety guard device as defined in claim 10, wherein said cover portion is a flat rectangular member which is slightly larger than the cassette tape opening.

15. The safety guard device as defined in claim 10, wherein each of said pair of biased latching members includes a stepped surface which compensates for variations in the cassette tape opening.

16. The safety guard device as defined in claim 10, wherein each of said manually slidable release members includes at least one inclined surface when pressed to force the safety guard device into the cassette tape opening.

17. The safety guard device as defined in claim 16, wherein said inclined surface takes the form of a half of a duplex-concaved surface.

18. The safety guard device as defined in claim 10, wherein each of said pair of biased latching members includes a helical biasing spring.

19. The safety guard device as defined in claim 10, wherein said each of said slidable release members comprises an inner square portion which is fitted into a rectangular slot formed in the cover portion and is fitted into a square opening formed in said biased latching member and is securely fastened thereto.

20. A device for protecting and guarding the tape receiving opening of a video cassette recorder comprising, an injected molded polystyrene body having a hollow rectangular insertable portion for being inserted into the cassette receiving opening and having a rectangular cover portion for covering the cassette receiving opening, a spring biased latching member slidably guided within each end of said hollow rectangular insertable portion and having a plurality of steps for engaging the respective sides of the cassette receiving opening, a slide knob fastened to each of said spring biased latching member for retracting and disengaging the steps from the sides of the cassette receiving opening, each of said slide knobs having an outer inclined surface said outer inclined surface creating an inward force which forces said hollow rectangular insertable portion into the cassette receiving opening when said spring biased latching members are retracted, and a pull knob for withdrawing said hollow rectangular insertable portion from the cassette receiving opening when said spring biased latching members are retracted and disengaged.

* * * * *